(12) United States Patent
Matsuoka et al.

(10) Patent No.: US 12,134,150 B2
(45) Date of Patent: Nov. 5, 2024

(54) ARC WELDING CONTROL METHOD WITH IMPOSED CURRENTS

(71) Applicant: Panasonic Intellectual Property Management Co., Ltd., Osaka (JP)

(72) Inventors: Noriyuki Matsuoka, Osaka (JP); Shun Satou, Osaka (JP); Masaru Kowa, Osaka (JP); Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 798 days.

(21) Appl. No.: 17/331,894

(22) Filed: May 27, 2021

(65) Prior Publication Data

US 2021/0299773 A1 Sep. 30, 2021

Related U.S. Application Data

(63) Continuation of application No. PCT/JP2019/044959, filed on Nov. 15, 2019.

(30) Foreign Application Priority Data

Nov. 29, 2018 (JP) .................................. 2018-223288

(51) Int. Cl.
*B23K 9/09* (2006.01)
*B23K 9/12* (2006.01)
(Continued)

(52) U.S. Cl.
CPC .............. *B23K 9/092* (2013.01); *B23K 9/125* (2013.01); *B23K 35/383* (2013.01); *B23K 2103/10* (2018.08)

(58) Field of Classification Search
CPC ...... B23K 9/092; B23K 9/125; B23K 35/383; B23K 2103/10; B23K 9/02; B23K 9/093; B23K 35/0261; B23K 35/286
See application file for complete search history.

(56) References Cited

U.S. PATENT DOCUMENTS 4,857,692 A * 8/1989 Larson .................. B23K 9/173
219/137 R
6,051,807 A 4/2000 Ogasawara et al.
(Continued)

FOREIGN PATENT DOCUMENTS

CN 106914683 7/2017
DE 10144423 A1 * 4/2003 ............. B23K 9/092
(Continued)

OTHER PUBLICATIONS

Praveen, Pushkar & M.J, Kang & Yarlagadda, Prasad. (2006). Arc voltage behavior of one drop per pulse mode in GMAW-P. Journal of Achievements in Materials and Manufacturing Engineering. vol. 17, Issue 1-2; pp. 389-392 (Year: 2006).*
(Continued)

*Primary Examiner* — John P. Dulka
(74) *Attorney, Agent, or Firm* — Wenderoth, Lind & Ponack, L.L.P.

(57) ABSTRACT

A pulse welding period alternately includes a first peak period in which a first peak current whose peak value is a first current value is caused to flow through a welding wire and a base period in which a base current having a second current value is caused to flow through the welding wire. During the base period, a second peak current whose peak current value is a sum of a second current value and a third current value and is smaller than the first current value is superimposed on the base current at a second pulse frequency. A second peak period in which the second peak current is caused to flow once is shorter than the first peak period. During the first peak period, a droplet is transferred from the welding wire toward a base material.

14 Claims, 10 Drawing Sheets

(51) Int. Cl.
*B23K 35/38* (2006.01)
*B23K 103/10* (2006.01)

(56) References Cited

U.S. PATENT DOCUMENTS

| | | | |
|---|---|---|---|
| 2007/0102409 A1 | 5/2007 | Koshiishi et al. | |
| 2007/0210048 A1 | 9/2007 | Koshiishi et al. | |
| 2008/0237196 A1 | 10/2008 | Yamazaki et al. | |
| 2012/0111842 A1* | 5/2012 | Fujiwara | B23K 9/09 219/130.33 |
| 2019/0176257 A1 | 6/2019 | Furuyama et al. | |

FOREIGN PATENT DOCUMENTS

| | | | | |
|---|---|---|---|---|
| EP | 3244522 | | 11/2017 | |
| EP | 3244522 A1 * | | 11/2017 | B23K 9/092 |
| JP | 53-62755 | | 6/1978 | |
| JP | 56-144871 | | 11/1981 | |
| JP | 58-68473 | | 4/1983 | |
| JP | 02-031630 | | 7/1990 | |
| JP | 8-309533 | | 11/1996 | |
| JP | 10-277740 | | 10/1998 | |
| JP | 2007-130647 | | 5/2007 | |
| JP | 2007-237270 | | 9/2007 | |
| JP | 2011-110600 | | 6/2011 | |
| JP | 4857163 | | 1/2012 | |
| JP | 2013-043209 | | 3/2013 | |
| JP | 2016-128187 | | 7/2016 | |
| JP | WO2018/043626 | | 3/2018 | |

OTHER PUBLICATIONS

Extended European Search Report issued Dec. 15, 2021 in corresponding European Patent Application No. 19891433.5.
International Search Report issued Jan. 28, 2020 in International (PCT) Application No. PCT/JP2019/044959 with English translation.
Communication pursuant to Article 94(3) EPC issued May 26, 2023 in European Patent Application No. 19 891 433.5.
Office Action issued Oct. 13, 2022 in corresponding European Patent Application No. 19 891 433.5.

* cited by examiner

FIG.5

| SETTING CURRENT Is [A] | SETTING VOLTAGE Vs [V] | WIRE FEED SPEED Wp [m/min] | FIRST CURRENT VALUE (PEAK CURRENT) Ip1(IA) [A] | FIRST PEAK PERIOD Tp1 [μsec] | SECOND CURRENT VALUE (BASE CURRENT) IB [A] | THIRD CURRENT VALUE IC [A] | SECOND PEAK CURRENT Ip2(IB+IC) [A] | SECOND PEAK PERIOD Tp2 [μsec] | SECOND BASE PERIOD Tb2 [μsec] | BASE PERIOD Tb [μsec] | FIRST PULSE FREQUENCY Fp1 [Hz] | SECOND PULSE FREQUENCY Fp2 [Hz] | PULSE NUMBER n(回) | PLATE THICKNESS t [mm] |
|---|---|---|---|---|---|---|---|---|---|---|---|---|---|---|
| 50 | 15 | 3.5 | 350 | 1810 | 25 | 30 | 55 | 950 | 1900 | 18190 | 50 | 351 | 5 | 1.5 |
| 60 | 17 | 4.5 | 360 | 1780 | 25 | 35 | 60 | 900 | 1800 | 8220 | 100 | 370 | 3 | 2 |
| 90 | 19 | 6.5 | 380 | 1630 | 35 | 70 | 105 | 660 | 1320 | 5036 | 150 | 505 | 2 | 3 |
| 130 | 21 | 9 | 400 | 1570 | 45 | 95 | 140 | 490 | 980 | 3430 | 200 | 680 | 2 | 4 |
| 180 | 24 | 12 | 420 | 1520 | 60 | 120 | 180 | 340 | 680 | 1813 | 300 | 980 | 1 | 6 |

BASE MATERIAL: ALUMINUM
WELDING WIRE: HARD ALUMINUM (ER5356)
WIRE DIAMETER: 1.2 mm

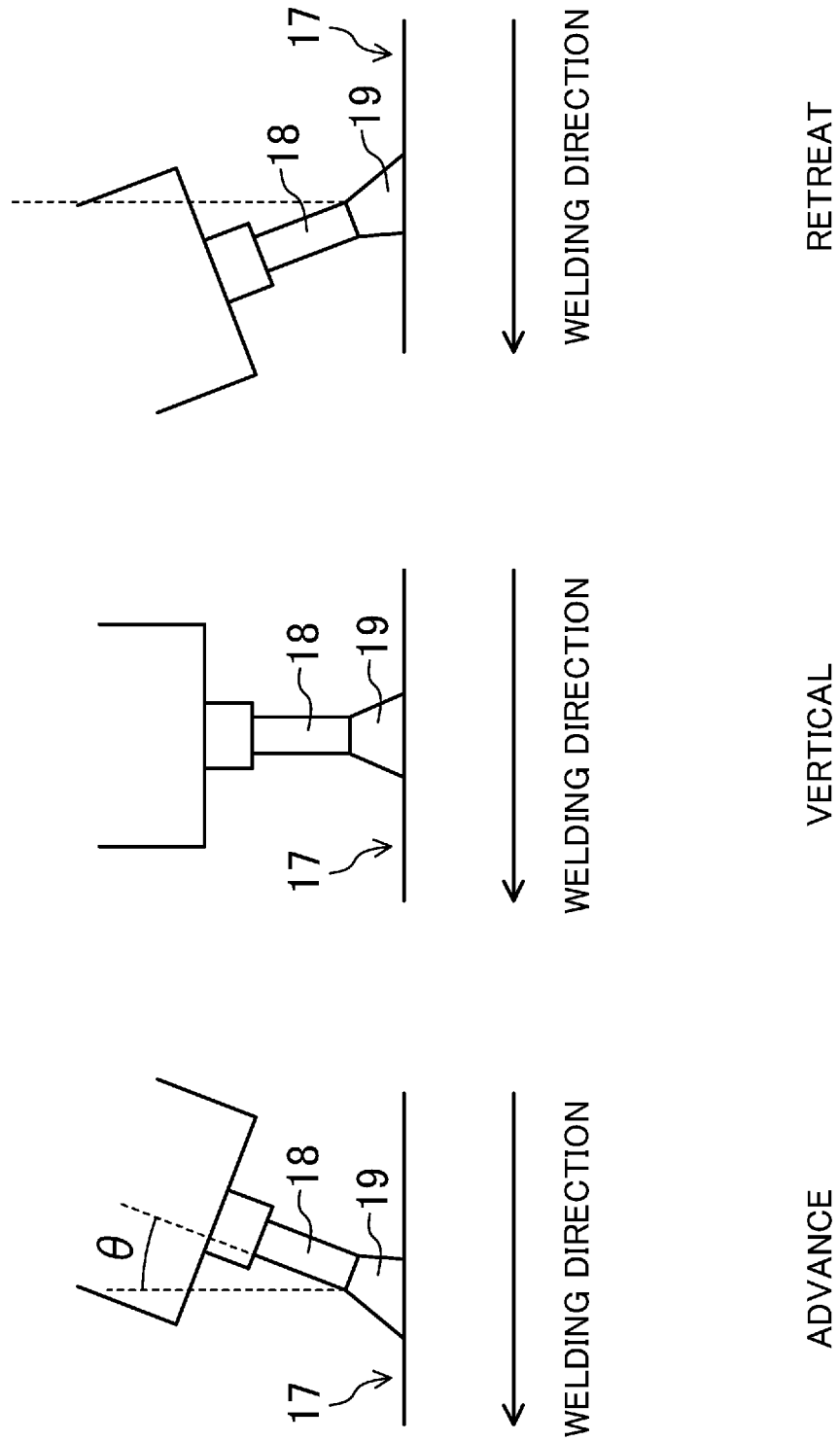

ARC WELDING CONTROL METHOD WITH IMPOSED CURRENTS

CROSS-REFERENCE TO RELATED APPLICATIONS

This is a continuation of International Application No. PCT/JP2019/044959 filed on Nov. 15, 2019, which claims priority to Japanese Patent Application No. 2018-223288 filed on Nov. 29, 2018. The entire disclosures of these applications are incorporated by reference herein.

BACKGROUND

The present disclosure relates to an arc welding control method and particularly relates to a control method for pulse welding.

In welding of a bicycle, a motorcycle, or the like, from a viewpoint of realizing a beautiful wave-shaped weld bead and increasing productivity, consumable electrode type MIG welding or MAG welding is used in more cases. In consumable electrode type MIG welding or MAG welding, welding is performed by causing a current to flow through a welding wire as an electrode while melting the welding wire using arc heat generated between the welding wire and a base material, and therefore, high welding efficiency and high welding speed can be achieved.

Incidentally, in consumable electrode type MIG welding or MAG welding, in order to control a bead shape, methods in which a difference in heat input to a base material is made and thus an amount of heat input is controlled have been proposed, and typical examples of those methods are short-circuit welding and pulse welding. In pulse welding, a peak current at which a droplet is detached from a welding wire and which is higher than a critical current value and a base current at which an arc is maintained and which is lower than the critical current value are caused to alternately flow through the welding wire, and thus, a droplet can be transferred while an average current value is kept at the critical current value or lower. For this reason, pulse welding is used in many cases. Also, because the droplet is transferred once in a period in which the peak current is caused to flow once, this droplet transfer is also called one-pulse one-drop control.

In pulse welding, on the other hand, a problem arises in which a current value is high when the droplet is detached, so that spatters tend to be generated and also, in a case where $CO_2$ gas is used as a shield gas, a reaction force of an arc generated is large and one-pulse one-drop control is difficult.

Therefore, a control method in which a waveform of a peak current is changed to continuously perform detaching and growing a droplet (see, for example, Japanese Examined Patent Publication No. H02-031630) or a control method in which pulse currents having different peak values and different pulse widths are caused to flow through a welding wire, a droplet is detached by one of the pulse currents, and the droplet is grown by the other one of the pulse currents (see, for example, Japanese Patent No. 4857163) have been proposed.

SUMMARY

Incidentally, in recent years, as a base material that is a welding object, aluminum or an alloy containing aluminum as a main component is used in many cases and, in arc welding of these materials, pulse welding is used in more and more cases.

However, the known methods disclosed in Japanese Examined Patent Publication No. H02-031630 and Japanese Patent No. 4857163 are related to arc welding using $CO_2$ gas, and it has been difficult to apply the methods as they are to arc welding using a shield gas containing an inert gas as a main component. Moreover, a problem also arises in which an amount of heat input to a base material is large in pulse welding in which a welding current is higher than that in short-circuit welding, and therefore, particularly, in a case where the base material is a thin plate, it is difficult to control a shape of a weld bead.

In view of the foregoing, the present disclosure has been made and it is therefore an object of the present disclosure to provide an arc welding control method for controlling arc welding including pulse welding capable of forming a weld bead having a good appearance by a lower welding current.

To achieve the above-described object, an arc welding control method according to the present disclosure includes a pulse welding period in which an arc is generated between a base material and a welding wire by feeding the welding wire toward the base material at predetermined feed speed and causing a peak current and a base current to alternately flow through the welding wire, the pulse welding period alternately includes a first peak period in which a first peak current whose peak current value is a first current value is caused to flow through the welding wire and a base period in which a base current having a second current value is caused to flow through the welding wire, during the base period, a second peak current is superimposed on the base current at a second pulse frequency that is higher than a first pulse frequency of the first peak current such that the peak current value is a sum of the second current value and a third current value, the sum of the second current value and the third current value is smaller than the first current value, a second peak period in which the second peak current is cause to flow through the welding wire once is shorter than the first peak period, and a droplet is transferred from the welding wire toward the base material during the first peak period or immediately after the first peak period.

According to this method, stable pulse welding with a low welding current can be performed. Moreover, a weld bead having a good appearance can be stably formed.

According to the present disclosure, stable pulse welding can be performed with a low welding current. Moreover, a weld bead having a good appearance can be stably formed.

BRIEF DESCRIPTION OF THE DRAWINGS

FIG. 5 is a table illustrating examples of welding conditions set in accordance with the procedures illustrated in FIG. 4.

FIG. 10 is a view illustrating an angle between a tip end of a welding wire and a welding direction.

DETAILED DESCRIPTION

Embodiments of the present disclosure will be described below with reference to the accompanying drawings. The following description of preferred embodiments describes mere examples by nature and is not intended to limit the scope, application, or use of the present disclosure.

First Embodiment

[Configuration of Arc Welding Device]

Figure 1:
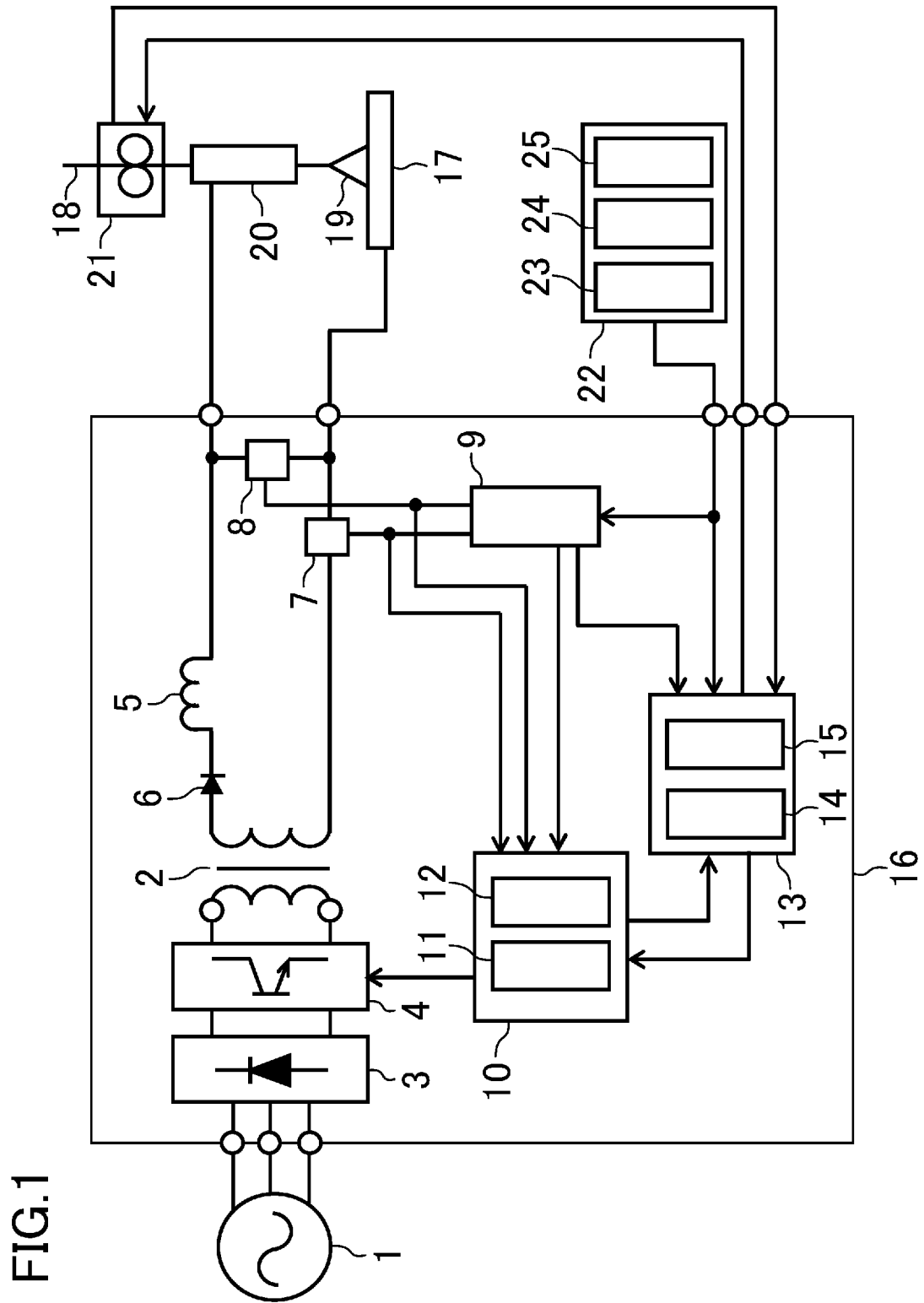
FIG. 1 is a block diagram illustrating a schematic configuration of an arc welding device according to a first embodiment of the present disclosure.

FIG. 1 is a block diagram illustrating a schematic configuration of an arc welding device according to this embodiment. An arc welding device 16 performs welding by repeating an arc state and a short-circuit state between a welding wire 18 that is a consumable electrode and a base material 17 that is a welding object. Note that the welding wire 18 is held by an unillustrated torch, the torch moves at predetermined speed, and thus, similar to the torch, a tip end of the welding wire 18 moves along a predetermined welding zone at the same speed. In this embodiment, a material of the welding wire 18 is hard aluminum (ER5356), a wire diameter thereof is 1.2 mm, a material of the base material 17 is aluminum, and a plate thickness thereof is 3.0 mm. However, the base material 17 may be an alloy containing aluminum as a main component, that is, for example, A5052 or the like. A shield gas sprayed to the base material 17 contains argon (Ar) gas at a ratio of 80% or more and a flow rate is set to 20 L/min. The flow rate of the shield gas is not limited thereto.

The arc welding device 16 includes a main transformer 2, a primary-side rectifier 3, a switch 4, a DCL (reactor) 5, a secondary-side rectifier 6, a welding current detector 7, a welding voltage detector 8, a control switch 9, an output controller 10, and a wire feed speed controller 13. The arc welding device 16 includes a robot controller (not illustrated) that controls an operation of a robot (not illustrated) holding a torch (not illustrated).

The output controller 10 includes a short-circuit welding controller 11 and a pulse welding controller 12. The wire feed speed controller 13 includes a wire feed speed detector 14 and a calculator 15. The primary-side rectifier 3 rectifies an input voltage input from an input power supply (three-phase AC power supply) 1 located outside the arc welding device 16. The switch 4 controls an output of the primary-side rectifier 3 to make it suitable for welding. The main transformer 2 converts an output of the switch 4 to make it suitable for welding.

The secondary-side rectifier 6 rectifies an output of the main transformer 2. The DCL (reactor) 5 smooths an output of the secondary-side rectifier 6 to make it suitable for welding. The welding current detector 7 detects a welding current. The welding voltage detector 8 detects a welding voltage.

The control switch 9 outputs a timing of switching from short-circuit welding control to pulse welding control and a timing of switching from pulse welding period to a cooling period to the output controller 10. The control switch 9 has a clock function, clocks a predetermined time set by a welding condition setting part 22, and outputs a timing of switching control to the output controller 10 and the wire feed speed controller 13. Note that the term "cooling period" refers to, for example, a period in which a welding current I is made zero and, in this period, an amount of heat input from an arc 19 becomes zero (see FIG. 9).

The output controller 10 outputs a control signal to the switch 4 to control a welding output. The short-circuit welding controller 11 performs control of short-circuit welding in a case where the control switch 9 commands short-circuit welding. The pulse welding controller 12 performs control of pulse welding in a case where the control switch 9 commands pulse welding. Note that, as will be described later, at least for control of pulse welding, welding conditions are set based on an appearance of a weld bead actually formed in the base material 17 or the like, are made into a table in a predetermined format, and are stored in an unillustrated memory.

The wire feed speed controller 13 controls a wire feeder 21 to control feed speed of the welding wire 18. The wire feed speed detector 14 detects wire feed speed. The calculator 15 calculates, based on a signal from the wire feed speed detector 14, an integrated amount of a feed amount of the welding wire 18 and controls the wire feed speed. Specifically, a command value and a detection value of the wire feed speed are compared and a difference therebetween is obtained, and feedback control is performed based on an integrated amount of the difference such that an actual wire feed speed matches the command value.

The wire feeder 21 and the welding condition setting part 22 are coupled to the arc welding device 16. The welding condition setting part 22 is used for setting welding conditions to the arc welding device 16. The welding condition setting part 22 includes a short-circuit welding setting part 23, a pulse welding setting part 24, and a cooling period setting part 25. The wire feeder 21 performs control feeding of the welding wire 18, based on a signal from the wire feed speed controller 13.

When an unillustrated torch SW (switch) is turned on, a welding output of the arc welding device 16 is supplied to the welding wire 18 via a welding chip 20. By the welding output of the arc welding device 16, the arc 19 is generated between the welding wire 18 and the base material 17 that is a welding object, and thus, welding is performed.

Note that, in actually performing arc welding, only pulse welding may be performed between the welding wire 18 and the base material 17 without through a short-circuit state. In this case, the control switch 9, the short-circuit welding setting part 23, and the cooling period setting part 25 may be omitted.

[Control Method for Pulse Welding]

Figure 2:
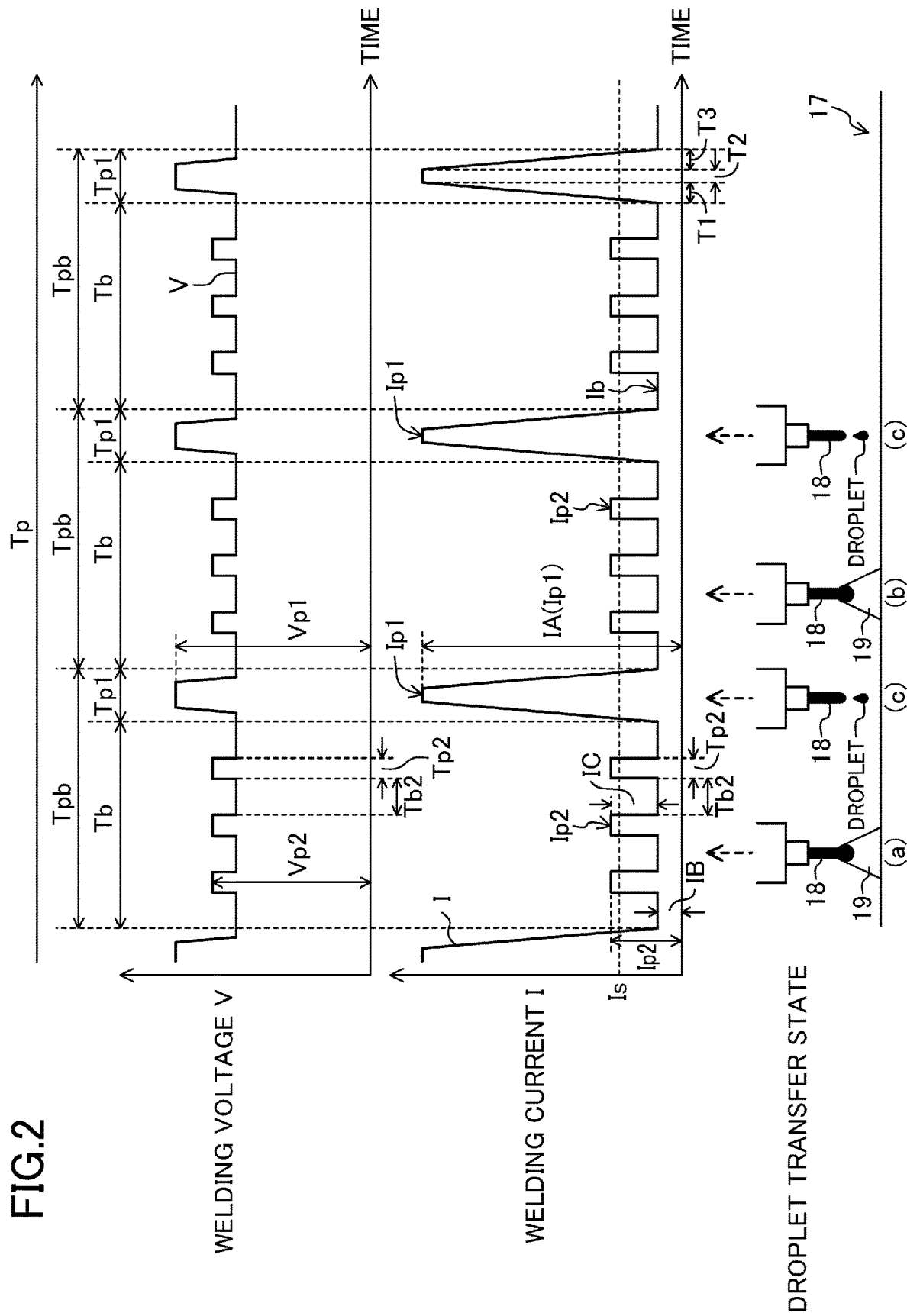
FIG. 2 is a diagram illustrating waveforms of a welding current and a welding voltage during pulse welding and a droplet transfer state.
Figure 3:
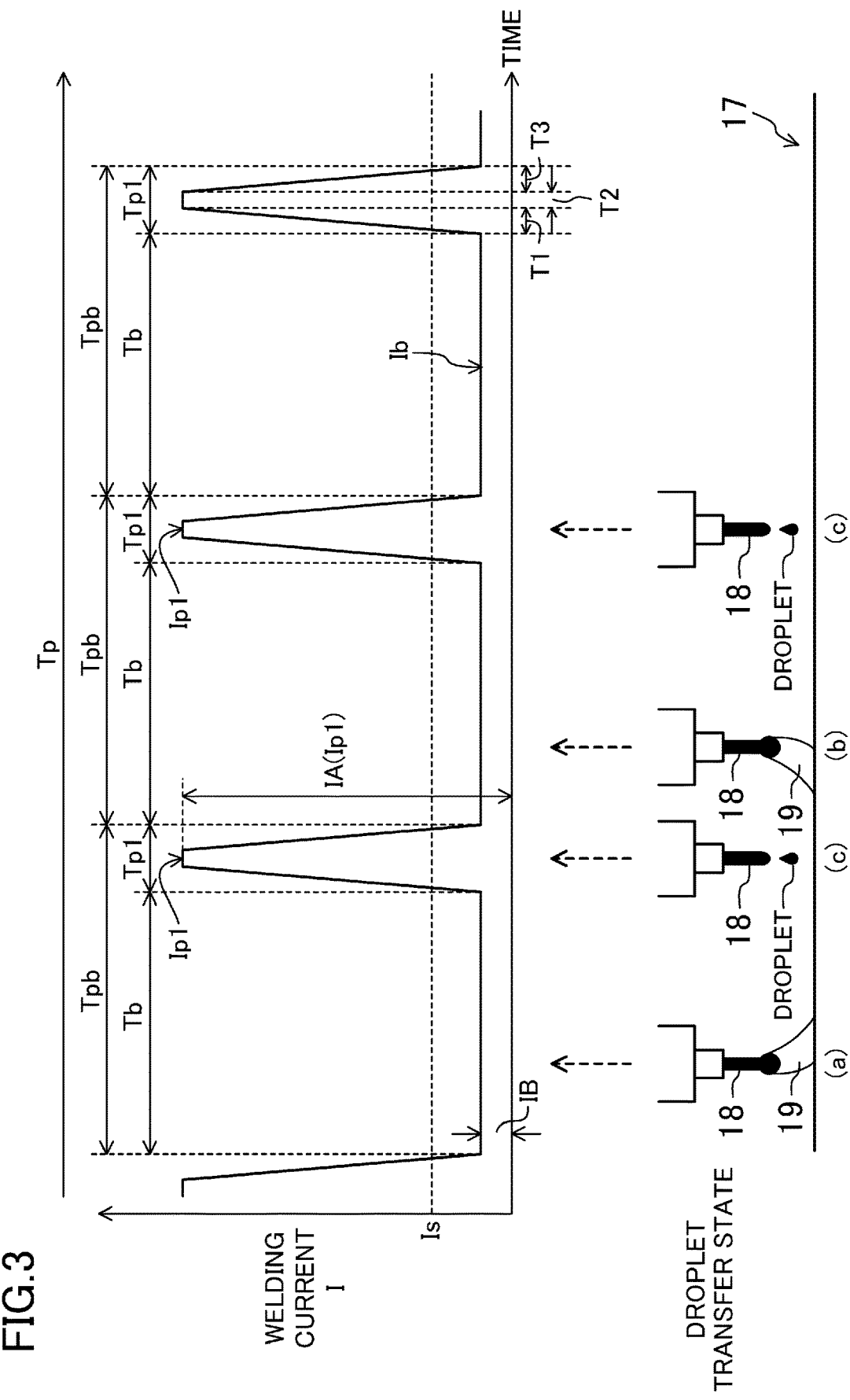
FIG. 3 is a diagram illustrating a waveform of a welding current and a droplet transfer state for comparison.

FIG. 2 is a diagram illustrating a time relationship between waveforms of a welding current and a welding voltage and a droplet transfer state during pulse welding according to this embodiment, and FIG. 3 is a diagram illustrating a time relationship between a waveform of a welding current and a droplet transfer state during pulse welding for comparison. Note that, although not illustrated, feed speed Wp (which will be hereinafter referred to as wire feed speed Wp. See FIG. 9) of the welding wire 18 is kept to be constant during a pulse welding period Tp.

Note that a setting average value (which will be hereinafter occasionally referred to as a setting current Is) of the welding current I corresponds to a moving average value of the welding current I during the pulse welding period Tp, and a setting average value (which will be hereinafter occasionally referred to as a setting voltage Vs) of a welding voltage V corresponds to a moving average value of the welding voltage V during the pulse welding period Tp. Herein, the term "moving average value" refers to an average value for each certain zone that has been obtained while shifting the zone. In this embodiment, the welding current I is controlled based on the setting current Is. Specifically, when the setting current Is is set, the welding current I is controlled such that this setting value is maintained during the pulse welding period Tp.

The setting current Is and the wire feed speed Wp are in a proportional relationship. Specifically, the setting current Is is determined in accordance with the wire feed speed Wp and, in a case where feeding of the welding wire 18 is performed by alternately repeating forward feeding and reverse feeding, the setting current Is is determined in accordance with an average feed speed Ws of the wire feed speed Wp. Alternatively, the wire feed speed Wp is determined in accordance with the setting current Is and, in a case where feeding of the welding wire 18 is performed by alternately repeating forward feeding and reverse feeding, the average feed speed Ws of the wire feed speed Wp may be determined in accordance with the setting current Is (see FIG. 9).

As illustrated in FIG. 2 and FIG. 3, during the pulse welding period Tp, a basic unit period Tpb is repeated once or multiple times, and thus, pulse welding of the base material 17 is performed. When a period in which a first peak current Ip1 is caused to flow through the welding wire 18 is a first peak period Tp1 and a period in which a base current Ib is caused to flow therethrough after the first peak period Tp1 is a base period Tb, the basic unit period Tpb is a sum of the first peak period Tp1 and the base period Tb. In the first peak period Tp1, the first peak current Ip1 is caused to flow through the welding wire 18 once.

Note that, as is clear from FIG. 2 and FIG. 3, in the first peak period Tp1, the first peak current Ip1 has a pulsed waveform. In the base period Tb, each second peak current Ip2 has a pulsed waveform. Therefore, in the following description, in a case where the first peak current Ip1 and the second peak current Ip2 are considered as pulses, the first peak current Ip1 and the second peak current Ip2 will be occasionally referred to as a "pulse of the first peak current Ip1" and a "pulse of the second peak current Ip2." The number of times a first pulse of the first peak current Ip1 occurs during the first peak period Tp1 and the number of times a second pulse of the second peak current Ip2 occurs during the base period Tb will be occasionally referred to as pulse numbers.

In the following description, a peak value of the first peak current Ip1 and a current value of the base current Ib will be occasionally referred to as a first current value IA and a second current value IB, respectively. The second current value D3 is set to be lower than the setting current Is and also to be a value necessary for maintaining the arc 19.

Note that, when a current flowing through the welding wire 18 is increased steeply, there is a probability that a droplet formed at the tip end of the welding wire 18 is blown away to be spatters and, therefore, as illustrated in FIG. 2, a slope with a predetermined inclination is provided at a rise of the first peak current Ip1. When the current flowing through the welding wire 18 is reduced steeply, there is a probability that undershoot occurs, the welding current I becomes zero, and the arc 19 is cut, and therefore, a slope is provided at a rise of the first peak current Ip1. Therefore, as illustrated in FIG. 2, the first peak period Tp1 is expressed by Expression 1 below.

$$Tp1 = T1 + T2 + T3 \quad \text{[Expression 1]}$$

Herein, T1 is a rise period of the first peak current Ip1, T2 is a period in which the first peak current Ip1 holds the first current value IA, and T3 is a fall period of the first peak current Ip1. Note that, although, in reality, in a latter half portion of the rise period T1 of the first peak current Ip1, in order to reliably suppress the generation of spatters, the welding current I is controlled such that the inclination of the slope is further smaller, for convenience of description, in FIG. 2, the slope of the welding current I during the rise period T1 is illustrated to have a constant inclination. Also, although, in a latter half portion of the fall period T3 of the first peak current Ip1, in order to reliably prevent the arc 19 from being cut, the welding current I is controlled such that the inclination of the slope is further smaller, for convenience of description, in FIG. 2, the slope of the welding current I during the fall period T3 is illustrated to have a constant inclination.

The waveform of the welding current I illustrated in FIG. 2 is different from the waveform of the welding current I illustrated in FIG. 3 in a point that the second pulse of the second peak current Ip2 occurs n times (n is an integer equal to or larger than one) during the base period Tb and a third current value IC of the second peak current Ip2 is superimposed on the base current Ib at a predetermined frequency Fp2 (which will be hereinafter referred to as a second pulse frequency Fp2) of the second pulse. Note that, in the following description, in a case where the base current Ib that is a second current value D3 in the second pulse is used as a reference, the peak current value during the base period Tb is occasionally referred to as a third current value IC (see FIG. 2). Note that, as illustrated in FIG. 2, an actual peak current value of the second pulse is the second peak current Ip2 as a sum of the second current value IB and the third current value IC. The welding current I is controlled such that the second peak current Ip2 is lower than the first peak current Ip1 that is a peak current value of the first pulse. In this case, the second peak voltage Vp2 of a peak voltage value to which the second peak current Ip2 as the second pulse corresponds is lower than the first peak voltage Vp1 of a peak voltage value corresponding to the first peak current Ip1 as the first pulse.

Note that the first peak current Ip1 is higher than the second peak current Ip2, and the first peak current Ip1 and the second peak current Ip2 are higher than the base current Ib.

The second pulse frequency Fp2 (Hz) described above is expressed by Expression 2 below and is an inverse of a sum of a second peak period and a second base period.

$$Fp2 = 1/(Tp2 + Tb2) \quad \text{[Expression 2]}$$

Herein, Tp2 is a period (which will be hereinafter referred to as a second peak period Tp2) in which the second peak current Ip2 is caused to flow through the welding wire 18 once and corresponds to a pulse width of the second peak current Ip2. Tb2 is a period (which will be hereinafter referred to as a second base period Tb2) in which the base current Ib is caused to flow through the welding wire 18 following the second peak period Tp2 or immediately before the second peak period Tp2. Note that, as is clear from FIG. 2, the second base period Tb2 is longer than the second peak period Tp2. The second pulse frequency Fp2 of the second peak current Ip2 is a high frequency that is higher than a frequency Fp1 (=1/(Tp1+Tb); which will be hereinafter occasionally referred to as a first pulse frequency Fp1) of the first peak current Ip1 during the pulse welding period Tp. When the first peak period Tp1 is switched to the base period Tb, the second base period Tb2 is set following the first peak period Tp1, and subsequently, the second peak period Tp2 is set.

The number n of times the second peak current Ip2 is superimposed on the base current Ib during one base period Tb, in other words, a pulse number n of the second peak current Ip2 during one base period Tb, can be appropriately changed in accordance with the setting current Is, the thickness of the base material 17, or the like.

As illustrated by a state (c) in FIG. 2 and a state (c) in FIG. 3, during the first peak period Tp1 or immediately after the first peak period Tp1, welding conditions are set such that a droplet is transferred from the welding wire 18 toward the base material 17 (one-pulse one-drop control in which an on-pulse one-drop operation is performed by transferring the droplet to the base material 17 once each time the first peak current Ip1 is caused to flow once). Note that the welding wire 18 and the base material 17 are not short-circuited during pulse welding as well as during droplet transfer. Pulse welding control illustrated in FIG. 3 corresponds to one-pulse one-drop control in which a one-pulse one-drop operation in which, during the first peak period Tp1 or immediately after the first peak period Tp1, the droplet is transferred to the base material 17 once each time the first peak current Ip1 is caused to flow once is performed.

Note that, in pulse welding control illustrated in FIG. 2, various welding conditions are set, for example, as follows: the setting current Is is 60 A, the setting voltage Vs is 17 V, the first current value IA is 360 A, the second current value D3 is 25 A, and the third current value IC is 35 A (see FIG. 5). However, welding conditions are not particularly limited thereto, but the welding conditions including the setting current Is or the like can be appropriately changed in accordance with the thickness of the base material 17, materials of the base material 17 and the welding wire 18, or the like.

[Procedures of Setting Pulse Welding Conditions]

Figure 4:
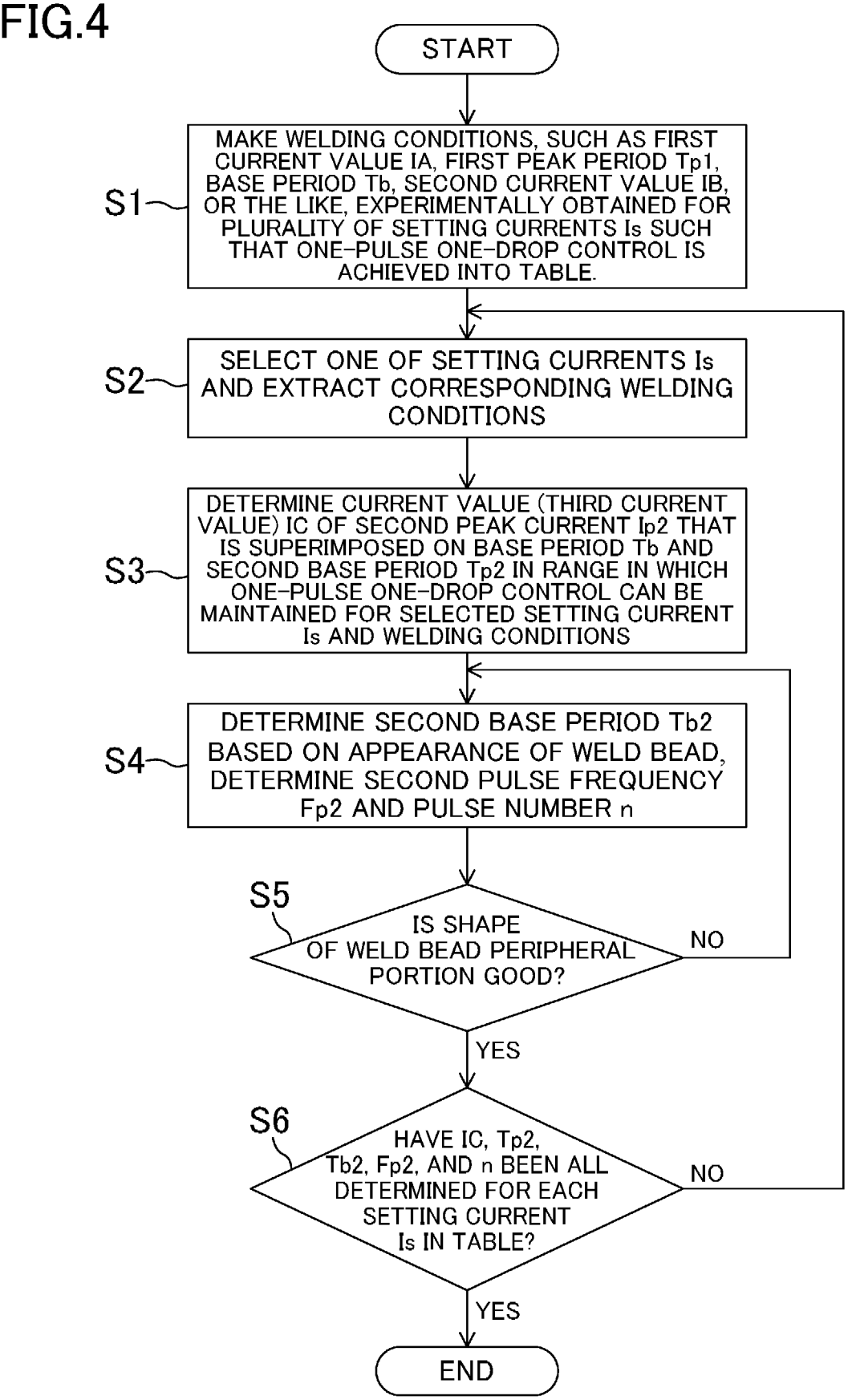
FIG. 4 is a flowchart illustrating procedures of setting pulse welding conditions.

FIG. 4 is a flowchart illustrating procedures of setting pulse welding conditions.

First, after materials of the base material 17 and the welding wire 18 are set, the setting current Is and the setting voltage Vs are set in accordance with the thickness of the base material 17. The materials of the base material 17 and the welding wire 18 in this embodiment are as described above, a plurality of thicknesses, for example, in a range of 1 mm to 6 mm are appropriately selected for the thickness of the base material 17, and the setting current Is and the setting voltage Vs are selected in accordance with the selected thicknesses. It is needless to say that a range of selection of the setting current Is or the setting voltage Vs is changed depending on the materials of the base material 17 and the welding wire 18 and the thickness of the base material 17.

Welding conditions, such as the first current value IA (first peak current Ip1), the first peak period Tp1, the base period Tb, the second current value IB, or the like, are experimentally obtained such that one-pulse one-drop control is achieved for one selected setting current Is. Subsequently, the welding conditions are experimentally obtained for each of the plurality of selected setting currents Is, and the obtained welding conditions are made into a table and are stored, for example, in a memory (not illustrated) (Step S1). Note that the memory may be provided outside the arc welding device 16 and, for example, a server or the like coupled to the arc welding device 16 via a wire or wireless connection may be used as the memory.

In the table created in Step S1, one setting current Is is selected and corresponding welding conditions are extracted (Step S2).

For the selected setting current Is and the welding conditions, in a range in which one-pulse one-drop control by the first peak current Ip1 can be maintained, a current value (third current value) IC of the second peak current Ip2 that is to be superimposed on the second current value D3 of the base period Tb, and the second peak period Tp2 are determined (Step S3).

Pulse welding is performed on the base material 17 using the welding conditions determined in the above-described manner to determine the second base period Tb2, based on an appearance of a formed weld bead. Each of the second pulse frequency Fp2 and the pulse number n are determined accordingly (Step S4).

In a weld bead peripheral portion, whether a shape of the weld bead is good, that is, specifically, whether an edge of the bead is irregular and whether fitness is good are separately observed (Step S5). If a determination result in Step S5 is negative, the process returns to Step S4, the third current value IC, the second peak period Tp2, the second pulse frequency Fp2, and the pulse number n are reset, and the process proceeds to Step S5.

If the determination result in Step S5 is positive, the process proceeds to Step S6, and it is determined whether, for each of the setting currents Is in the table, the third current value IC, the second peak period Tp2, the second base period Tb2, the second pulse frequency Fp2, and the pulse number n have been all determined.

If a determination result in Step S6 is positive, setting of the welding conditions is terminated and all of the welding conditions are made into a table and stored in a predetermined memory (not illustrated). On the other hand, if the determination result in Step S6 is negative, the process returns to Step S2, the setting current Is is reselected, and a series of processing from Step S3 to Step S6 is repeated.

FIG. 5 is a table illustrating examples of welding conditions set in accordance with the procedures illustrated in FIG. 4.

As is clear from FIG. 5, as the thickness of the base material 17 reduces, the setting current Is, the setting voltage Vs, and the wire feed speed Wp reduce. This is because the amount of heat input to the base material 17 necessary for welding reduces. As the setting current Is increases, each of the first to third current values IA to IC increases. A time integration value of the current flowing through the welding wire 18 during the base period Tb becomes large, and therefore, the base period Tb becomes short, so that the second pulse frequency Fp2 becomes high and the pulse number n becomes small accordingly.

Note that the conditions illustrated in FIG. 5 are merely examples, and in actually performing pulse welding, a set of proper welding conditions is set in accordance with the material and thickness of the base material 17, the wire diameter and material of the welding wire 18, and furthermore, a type, a flow rate, or the like of a shield gas.

[Effects and the Like]

As described above, the arc welding control method according to this embodiment includes the pulse welding period Tp in which the arc 19 is generated between the base material 17 and the welding wire 18 by feeding the welding wire 18 toward the base material 17 at the predetermined wire feed speed Wp and also causing the first peak current Ip1 and the base current Ib to alternately flow through the welding wire 18.

At least during the pulse welding period Tp, the welding current I is controlled based on the setting current Is that is a setting average value of the welding current I flowing through the welding wire 18.

The pulse welding period Tp alternately includes the first peak period Tp1 in which the first peak current Ip1 whose peak value is the first current value IA is caused to flow through the welding wire 18 and the base period Tb in which the base current Ib having the second current value D3 is caused to flow through the welding wire 18.

During the base period Tb, the second peak current Ip2 of the second pulse whose pulse number is n (n is an integer equal to or larger than one) is superimposed on the base current Ib at the second pulse frequency Fp2 of the second pulse that is higher than the first pulse frequency Fp1 of the first pulse such that the peak current value of the second pulse is a sum of the second current value IB and the third current value IC. Thus, the second pulse of the second peak current Ip2 whose pulse number is n and the first pulse of the first peak current Ip1 are repeatedly generated in an alternate manner.

The sum of the second current value IB and the third current value IC is smaller than the first peak current Ip1 as the first current value IA, and the second peak period Tp2 is shorter than the first peak period Tp1.

In the arc welding control method according to this embodiment, during the first peak period Tp1 or immediately after the first peak period Tp1, a droplet is transferred from the welding wire 18 toward the base material 17.

By configuring the arc welding control method in the above-described manner, in pulse welding with a low welding current whose setting current Is is set low, nonuniformity of the bead edge in the weld bead peripheral portion can be suppressed, nonuniformity of the bead edge can be stabilized, and the appearance of the weld bead can be made better. Fitness with the base material 17 in the weld bead peripheral portion is improved, and thus, a flat-shaped weld bead can be formed. This will be further described with reference to illustrations (a) and (b) in FIG. 6 and illustrations (a), (b), and (c) in FIG. 7.

Figure 6A:
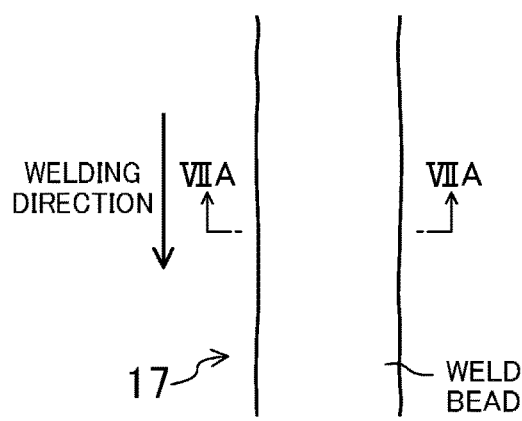
FIG. 6A and FIG. 6B are schematic plan views each illustrating a shape of a weld bead during pulse welding.
Figure 6B:
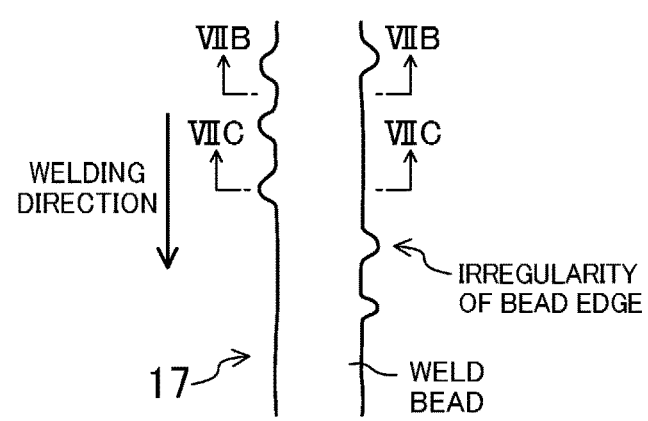
Figure 7A:
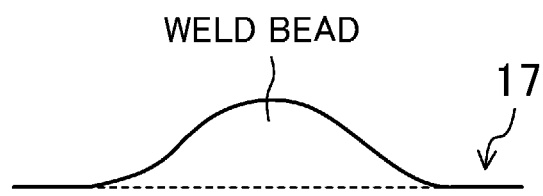
FIG. 7A, FIG. 7B and FIG. 7C are schematic cross-sectional views each illustrating a shape of a weld bead during pulse welding.
Figure 7B:
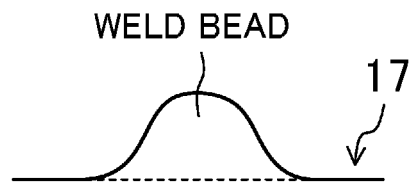
Figure 7C:
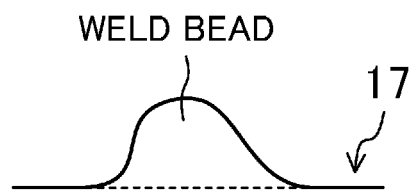

The illustrations in FIG. 6A and FIG. 6B are schematic plan views each illustrating a weld bead during pulse welding, and the illustrations in FIG. 7A, FIG. 7B and FIG. 7C are schematic cross-sectional views each illustrating a weld bead during pulse welding. Note that, in examples illustrated in the illustrations in FIG. 6A and FIG. 6B and the illustrations in FIG. 7A, FIG. 7B and FIG. 7C, a torch is continuously moved such that the welding speed is kept constant in a predetermined zone to perform pulse welding on the base material 17. The illustration in FIG. 7A is a schematic cross-sectional view taken along the line VIIA-VIIA in FIG. 6A, the illustration in FIG. 7B is a schematic cross-sectional view taken along the line VIIB-VIIB in FIG. 6B, and the illustration in FIG. 7C is a schematic cross-sectional view taken along the line VIIC-VIIC in FIG. 6B.

As illustrated in FIG. 3, in known one-pulse one-drop control, when the setting current Is is set low, accordingly, the second current value IB that is the current value of the base current Ib is a low value.

However, when the second current value D3 reduces to a predetermined value or less, the arc 19 can be maintained, but directivity of the arc 19 reduces and, during a different basic unit period Tpb or during the same basic unit period Tpb in the pulse welding period Tp, an incident direction or an incident position of the arc 19 relative to the base material 17 fluctuates in some cases (see states (a) and (b) of FIG. 3). When the above-described state occurs, there is a probability that a heat input position in the base material 17 unstably moves with respect to an advancing direction of a torch (which will be hereinafter referred to as a welding direction), and as a result, irregularity is generated in the bead edge in the weld bead peripheral portion and variations in a width of the weld bead occur (see the illustration in FIG. 6B).

On the other hand, according to this embodiment, as illustrated in FIG. 2, during the base period Tb, the second peak current Ip2 is superimposed on the base current Ib at the second pulse frequency Fp2 that is higher than the first pulse frequency Fp1. By doing this, the time integration value of the current flowing through the welding wire 18 during the base period Tb can be kept low. By periodically increasing an arc force during the base period Tb, reduction in the directivity of the arc 19 can be suppressed and heat can be stably input to a predetermined position of the base material 17 with respect to the welding direction. As a result, as illustrated in in FIG. 6A, irregularity of the bead edge in the weld bead peripheral portion can be suppressed, uniformity of the bead edge can be stabilized, the width of the weld bead can be stabilized, and also, the appearance of the weld bead can be made good.

During the base period Tb, by superimposing the second peak current Ip2 on the base current Ib, the time integration value of the current flowing through the welding wire 18 during the base period Tb is increased and the amount of heat input to the base material 17 can be made large, as compared to a case where the second peak current Ip2 is not superimposed. Thus, as compared to a case where there is no superimposition of the second peak current Ip2 (see FIG. 7B and FIG. 7C), as illustrated in FIG. 7A, a cross-sectional shape of the weld bead peripheral portion is smooth, so that fitness with the base material 17 can be improved and a flat weld bead can be formed.

By setting the sum of the second current value IB and the third current value IC to a smaller value than the first current value IA and setting the second peak period Tp2 to a shorter period than the first peak period Tp1, excessive increase in size of the droplet formed at the tip end of the welding wire 18 during the base period Tb can be prevented. This is because the base current Ib and the second peak current Ip2 alternately flow at the second pulse frequency Fp2 during the base period Tb, and therefore, even when the droplet slightly grows during the second peak period Tp2, growth of the droplet is suppressed during the following second base period Tb2. Thus, unintentional detachment of the droplet from the welding wire 18 during the base period Tb can be prevented and, during the pulse welding period Tp, the droplet can be reliably transferred toward the base material 17 from the welding wire 18 such that one-pulse one-drop operation in which the droplet is transferred to the base material 17 once each time the first peak current Ip1 is caused to flow once is performed at a predetermined timing during basic unit period Tpb, that is, during the first peak period Tp1 or immediately after the first peak period Tp1. Thus, the second pulse of the second peak current Ip2 whose pulse number is n and the first pulse of the first peak current Ip1 whose pulse number is one are repeatedly generated in an alternate manner, during the first peak period Tp1 or immediately after the first peak period Tp1, in other words, each time the first pulse of the first peak current Ip1 is caused to flow once, the droplet generated in the welding wire 18 during each basic unit period Tpb is transferred to the base material 17.

In order to suppress excessive growth of the droplet, the second base period Tb2 is preferably the same as or longer than the second peak period Tp2. Note that, as illustrated in FIG. 5, in this embodiment, a ratio Tp2:Tb2 between the second peak period Tp2 and the second base period Tb2 is set to 1:2, but there is no particular limitation on the ratio.

Note that, in a case where the welding current I is controlled such that the first peak current Ip1 is caused to flow multiple times during the first peak period Tp1, there is a probability that a timing of droplet transfer is not stabilized. In such a case, there is a probability that a pitch of a formed weld bead varies and a wave shape thereof is not uniform, so that the appearance of the weld bead is deteriorated. Therefore, it is preferable to cause the first peak current Ip1 to flow once during the first peak period Tp1.

Note that, as illustrated in FIG. 5, the peak value of the second peak current Ip2, that is, the sum of the second current value IB and the third current value IC, is preferably equal to or smaller than ½ of the first current value IA, that is, the peak value of the first peak current Ip1. Thus, excessive increase in size of the droplet formed at the tip end of the welding wire 18 during the base period Tb can be reliably prevented.

In a case where the thickness of the base material 17 is small and the setting current Is is set low, accordingly, the base current Ib is low. In such a case, during the base period Tb, the second peak current Ip2 may be superimposed on the base current Ib at the second pulse frequency Fp2 multiple times.

As a result of studies conducted by the present inventors, the third current value IC is preferably less than the 150 A, and is more preferably 100 A or less. The second base period Tb2 is preferably the same as or longer than the second peak period Tp2.

By setting the third current value IC, the second base period Tb2, and the second peak period in the above-described manner, the droplet can be more reliably transferred to the base material 17 from the welding wire 18 during the first peak period Tp1 or immediately after the first peak period Tp1. For example, by setting the third current value IC to a current value less than 150 A, the third current value IC can be made sufficiently smaller than the first current value IA. Thus, for one-pulse one-drop droplet transfer, progress of melting of the welding wire 18 caused by excessive increase in the amount of the current flowing through the welding wire 18 and fluctuation of timing of droplet transfer or fluctuation of the number of droplets to be transferred caused accordingly can be prevented.

Moreover, according to this embodiment, the base material 17 is irradiated with the arc 19 during the base period Tb, and thus, adhesion of a metal oxide forming the welding wire 18 or the base material 17 to a surface of the base material 17 is suppressed.

In a case where pulse welding of an aluminum-based material is performed, a problem arises in which a metal oxide (which will be hereinafter referred to as smut) produced by bonding of vaporized metal of the base material 17 or the welding wire 18 and oxygen in air or the like tends to be adhered to the base material 17 and the appearance of the weld bead is impaired. In particular, in a case where the welding wire 18 is a hard aluminum-based material, adhesion of the smut is notable.

According to this embodiment, during the base period Tb, the second peak current Ip2 of the second pulse whose pulse number is n, the second peak current Ip2 being lower than the first peak current Ip1, is superimposed on the base current Ib at the second pulse frequency Fp2 of the first pulse of the second peak current Ip2, the second pulse frequency Fp2 being higher than the first pulse frequency Fp1 of the first pulse of the first peak current Ip1, such that the second peak period Tp2 of the second pulse that is shorter than the first peak period Tp1 of the first pulse of the first peak current Ip1 is provided, and the second pulse of the second peak current Ip2 whose pulse number Is n and the first pulse of the first peak current Ip1 whose pulse number is one are repeatedly generated in an alternate manner. In this case, the second peak voltage Vp2 corresponding to the second pulse of the second peak current Ip2 is lower than the first peak voltage Vp1 corresponding to the first pulse of the first peak current Ip1. Thus, the arc force of the arc 19 generated between the welding wire 18 and the base material 17 is caused to fluctuate periodically, that is, in other words, at the second pulse frequency Fp2, with a preferable degree of strength, to increase the directivity of the arc and stably apply the arc to the base material 17. During the second peak period Tp2, in a state where the arc force is strengthened to be stronger than that during the second base period Tb2, the surface of the base material 17 is irradiated with the arc 19, and thus, an oxide film on the surface of the base material 17 is decomposed and cleaned. That is, a kind of cleaning effect works, so that adhesion of the smut on the surface of the base material 17 can be suppressed.

Note that the second pulse of the second peak current Ip2 whose pulse number is n and the first pulse of the first peak current Ip1 whose pulse number is one are repeatedly generated in an alternate manner, but it is more preferable that the pulse number of the second peak current Ip2 is more than one and the second pulse of the second peak current Ip2 whose pulse number is more than one and the first pulse of the first peak current Ip1 whose pulse number is one are repeatedly generated in an alternate manner.

Thus, a pulse of the second peak current Ip2 during the base period Tb is more stable. The directivity of the arc 19 or adhesion of the smut to the surface of the base material 17 affecting irregularity of the bead edge of the weld bead or the like can be further suppressed and a cleaning performance of the weld bead can be made more stable and thus maintained.

Figure 8:
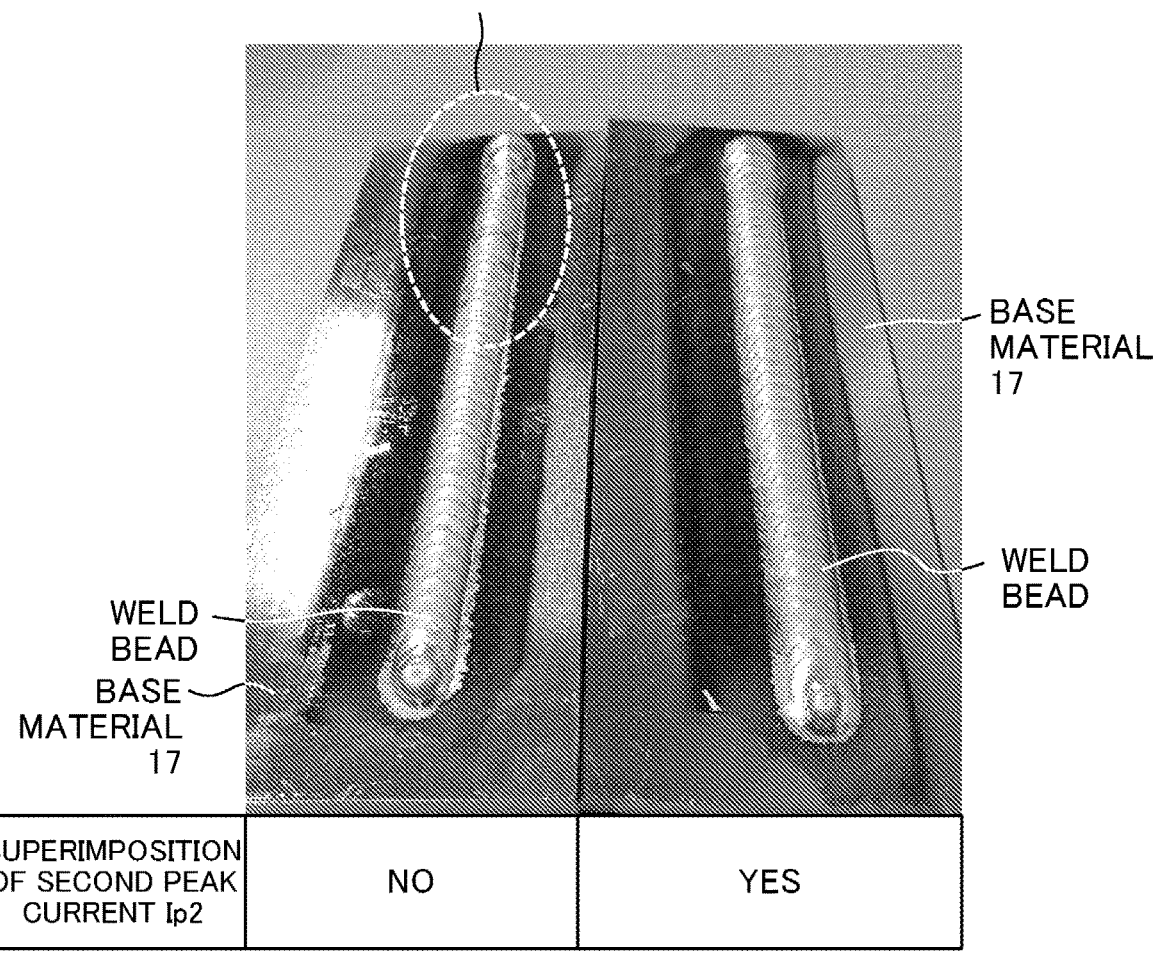
FIG. 8 is a photograph illustrating an appearance of a weld bead during pulse welding.

FIG. 8 is a photograph illustrating an appearance of the weld bead in this embodiment. In an example illustrated in FIG. 8, switching between on and off of the welding current is repeated while feeding the torch relatively in the welding direction at constant speed to perform pulse stitch welding in which the base material 17 is welded by pulse welding such that the weld bead is formed into a scale-like bead shape, and in repeating switching between on and off of the welding current, simultaneously, feeding a wire and stopping wire feeding are repeated (see FIG. 9).

As illustrated in FIG. 8, in a case where, during the base period Tb, the second peak current Ip2 has not been superimposed, there is adhesion of the smut in the weld bead, whereas, as in this embodiment, in a case where the second peak current Ip2 is superimposed, adhesion of the smut is not observed and the weld bead having a good appearance is formed.

Note that, as the second pulse frequency Fp2 increases, the above-described cleaning effect increases. However, when the second pulse frequency Fp2 is a predetermined value or more, a frequency of oscillation due to fluctuation of the welding current I increases too high and noise becomes a problem.

Therefore, the second pulse frequency Fp2 is preferably 3000 Hz or less, and is more preferably 1000 Hz or less. On the other hand, when the second pulse frequency Fp2 is lower than the 300 Hz, an effect of increasing the directivity of the arc 19 during the base period Tb is reduced.

Therefore, the second pulse frequency Fp2 is preferably a high frequency of 300 Hz or more and 3000 Hz or less and, in a case where importance is placed on the problem of noise, is more preferably a high frequency of 300 Hz or more and 1000 Hz or less.

Note that, as another option, in order to increase the directivity of the arc 19 and the cleaning performance to the base material 17 during the base period Tb, for example, in the pulse welding control illustrated in FIG. 3, the base current Ib can be also increased uniformly during the base period Tb.

However, in this method, the cleaning performance itself is increased, but the following inconvenience occurs. First, during the pulse welding period Tp, the welding current I is controlled such that the setting current Is and/or the setting voltage Vs is maintained. When the base current Ib is uniformly increased during the base period Tb, a droplet transfer cycle is increased, and accordingly, the pitch of the weld bead is increased. The size of the droplet itself is also increased. In such a case, a difference in shape between a portion in which the droplet has fallen and a portion in which the droplet has not fallen is noticeable, and furthermore, there is a probability that winkles are generated in the weld bead. Also, there is a probability that the bead edge of the weld bead peripheral portion illustrated in FIG. 6B becomes irregular. Moreover, there is a probability that the size of the droplet has excessively increased and spatters are generated during droplet transfer.

When the base current Ib is increased to the predetermined value or more, in order to maintain the setting current Is, the first peak current Ip1 reduces in some cases. In such a case, there is a probability that the amount of heat input to the base material 17 is in shortage during droplet transfer and, as illustrated in FIG. 7B and FIG. 7C, the weld bead becomes narrower than a set value of the weld bead. In such a case, there is a probability that fitness with the base material 17 is deteriorated and a weld bead having a narrow width and a raised appearance is formed.

On the other hand, according to this embodiment, during the base period Tb, by superimposing the third current value IC of the second peak current Ip2 on the base current Ib at the second pulse frequency Fp2 and properly setting the second peak period Tp2 and/or the second base period Tb2, the directivity of the arc 19 during the base period Tb can be increased, the occurrence of irregularity of the bead edge in the weld bead peripheral portion can be suppressed, the width of the weld bead can be stabilized, and also a good appearance of the weld bead can be made. Moreover, fitness with the base material 17 is increased and a flat weld bead can be formed.

Depending on a finish state of the weld bead, the setting voltage Vs that has been initially set is changed to adjust the width of the weld bead in some cases. For example, there is a tendency that, when an arc length is large, the arc 19 spreads and the width of the weld bead becomes large. Therefore, if the width of the actually formed weld bead is wider than an initial target value, it is necessary to reduce the setting voltage Vs and thus adjust the arc length such that the arc length is reduced. On the other hand, when the width of the actually formed weld bead is smaller than the initial target value, it is necessary to increase the setting voltage Vs and thus adjust the arc length such that the arc length is increased. Similarly, even in a case where the arc length is too short and there is a probability that a minute short-circuit occurs, it is necessary to increase the setting voltage Vs and thus adjust the arc length such that the arc length is increased.

On the other hand, in the arc welding control method according to this embodiment, there is a tendency that, when the setting voltage Vs is adjusted to be increased in order to correct the arc length, the base current Ib is reduced and the pulse number n is reduced, whereas, when the setting voltage Vs is reduced, the base current Ib is increased and the pulse number n is increased.

Specifically, for example, in an example illustrated in FIG. 5, in a case where the setting value of the setting current Is is 60 A, when the setting voltage Vs is adjusted to be reduced by 1 V, the base period Tb is increased and the pulse number n increased to four. When the setting voltage Vs is adjusted to be increased by 1 V, the base period Tb is reduced and the pulse number n is reduced to two. As described above, the base period Tb fluctuates in accordance with the setting voltage Vs.

On the other hand, according to this embodiment, an optimal value of each parameter of the second peak current Ip2 is determined for the setting current Is. That is, the peak value of the second peak current Ip2 is determined using a raising value (that is, the third current value IC) form the second current value IB that is the current value of the base current Ib, and the second peak period Tp2 and the second base period Tb2 are determined as a certain cycle in accordance with the setting current Is. As a result, the second peak current Ip2 is output at the second pulse frequency Fp2.

Accordingly, even when the setting voltage Vs is adjusted in order to correct the arc length, the second peak current Ip2 is output in a certain cycle preset for the setting current Is, and therefore, the directivity of the arc 19 and the cleaning performance of the weld bead affecting irregularity of the bead edge of the weld bead or the like can be stably increased and thus maintained.

Note that, as described above, when the setting voltage Vs is changed, the base period Tb is changed, and therefore, the pulse number n is changed. In this embodiment, welding current I is controlled such that the other conditions of the second peak current Ip2, that is, the third current value IC, the second peak period Tp2, and the second base period Tb2, are not affected.

According to the control method of this embodiment, in a case where the base material 17 is aluminum or an alloy containing aluminum as a main component, adhesion of the smut can be suppressed and the weld bead having a beautiful appearance can be obtained. In a case where the welding wire 18 is a hard aluminum-based material, the smut adheres to the base material 17 more easily, and therefore, the arc welding control method of this embodiment is particularly useful.

In a case where the base material 17 is a so-called thin plate having a thickness of 1 mm or more and 6 mm or less, it is necessary to set the setting current Is low and thus perform pulse welding with a low welding current, and therefore, the arc welding control method of this embodiment is particularly useful.

Second Embodiment

Figure 9:
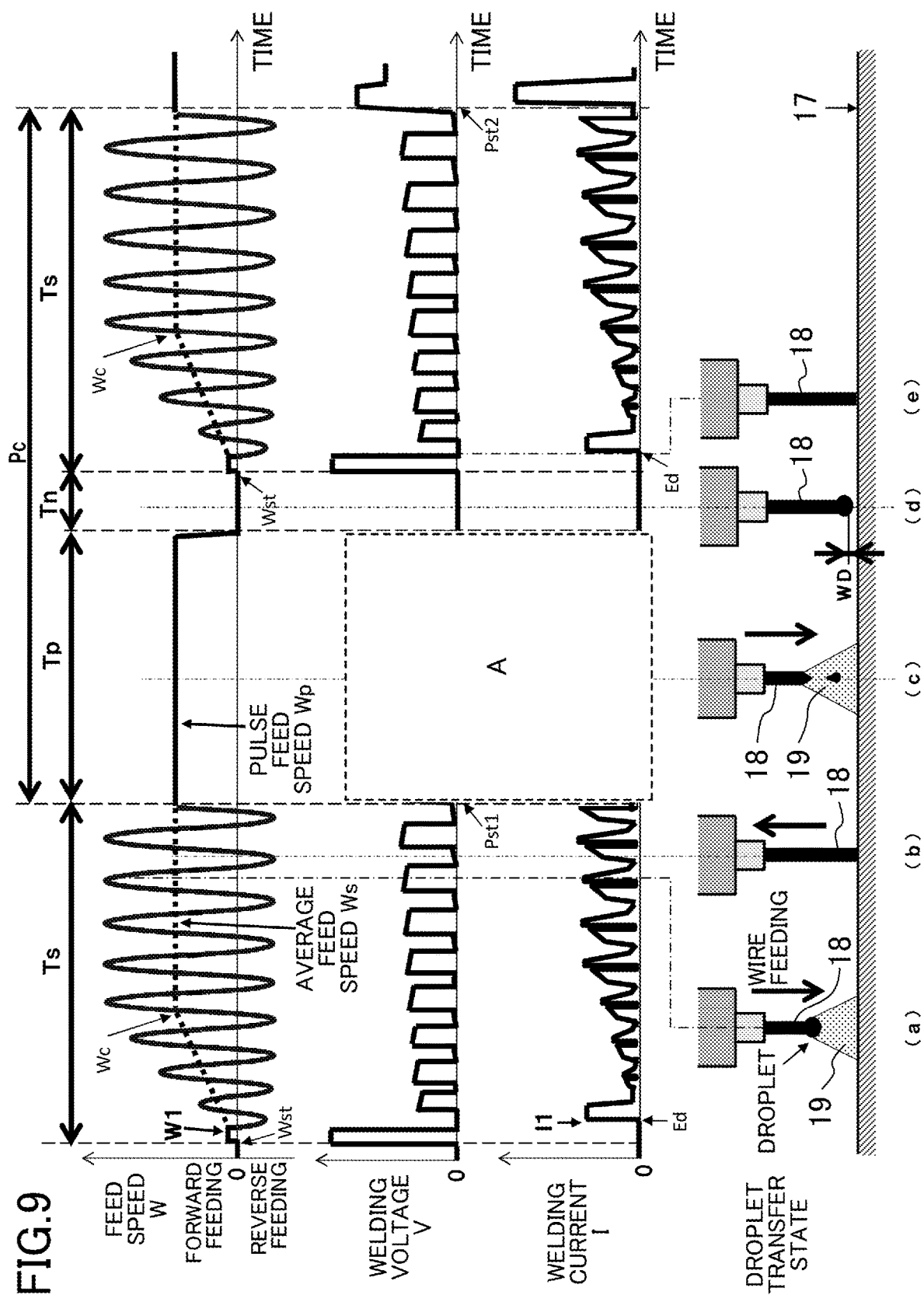
FIG. 9 is a diagram illustrating waveforms of various types of outputs during arc welding according to a second embodiment of the present disclosure.

FIG. 9 is a diagram illustrating waveforms of various types of outputs during arc welding according to this embodiment. An operation of the arc welding device 16 illustrated in FIG. 1 will be described with reference to FIG. 9. Note that, in this embodiment, the arc welding device 16 is operated such that, during arc welding, short-circuit welding and pulse welding are successively performed and, thereafter, a cooling period in which the welding current is made zero is provided. A torch (not illustrated) holding the welding wire 18 is controlled to move at certain speed in a predetermined zone in which welding is performed. That is, unlike general stitch welding in which welding is performed while the torch is stopped, welding is stopped, and then, the torch is moved to a next teaching point, the torch continuously moves such that the welding speed is kept constant in the predetermined zone. Note that the welding speed may not be constant throughout an entire welding portion of the base material 17. For example, in a portion in which the thickness of the base material 17 changes, or the like, the welding speed may be changed.

In FIG. 9, in a portion A surrounded by a dashed line, pulse welding is performed by repeating the basic unit period Tpb made up by the sum of the first peak period Tp1 and the base period Tb illustrated in FIG. 2 once or multiple times.

First, feeding of the welding wire 18 is started at feed speed W1 at a time point Wst where an instruction for a start of welding is made. At the time point Wst where the instruction for a start of welding is made or a time point Ed where the instruction for a start of welding has been made and the occurrence of a short circuit between the welding wire 18 and the base material 17 as a welding object is detected, control of welding by the short-circuit welding controller 11 under conditions set by the short-circuit welding setting part 23 is started to perform short-circuit welding. Next, when a predetermined time Ts preset by the short-circuit welding setting part 23 has elapsed, the control switch 9 switches from short-circuit welding to pulse welding. Thereafter, welding output is controlled by the pulse welding controller 12 under conditions set by the pulse welding setting part 24, and at a pulse welding start point Pst (Pst1, Pst2), pulse welding is started to be performed while repeating a peak current and a base current. At this time, the welding current I is controlled by the pulse welding controller 12 so as to have the waveform of the welding current illustrated in FIG. 2.

When the pulse welding period Tp that is the predetermined time preset by the pulse welding setting part 24 has elapsed, the control switch 9 switches from pulse welding to a cooling period. During a cooling period Tn that is a predetermined time set by the cooling period setting part 25, an output from the output controller 10 is blocked. Thus, the amount of heat input by an arc can be made zero. By repeating a first short-circuit welding period Ts, the pulse welding period Tp, and the cooling period Tn that have been described above successively as one welding cycle, a weld bead having a scale-like shape is formed.

As illustrated in FIG. 9, by providing, after the first short-circuit welding period Ts, the pulse welding period Tp in which the amount of heat input is large, and thereafter, further providing the cooling period Tn in which the amount of heat input is zero, a cooling effect in a welding portion can be increased and a difference in the amount of heat input can be made largest, so that the weld bead having a scale-like shape in which a wave shape is clearly formed can be realized. During the cooling period Tn, when an output of each of the welding current and the welding voltage is made zero, the amount of heat input can be made zero, and the cooling performance is best. If only the welding current is made zero and the welding voltage is kept to be applied, a state where a non-load voltage is generated can be maintained, and thus, a next arc start can be smoothly performed. When it is assumed that a cycle from the pulse welding start time point Pst1 of the pulse welding period Tp to the pulse welding start time point Pst2 of the pulse welding period Tp of a next cycle is a cycle PC of the pulse welding period, as the cycle Pc of the pulse welding period increases, roughness of the wave shape increases, whereas as the cycle Pc of the pulse welding period reduces, the wave shape is denser.

During the pulse welding period Tp, when the arc 19 is generated, without a molten pool formed immediately under the arc, the droplet of the welding wire 18 is blown away at outputting the first peak current Ip1 and spatters are generated. Therefore, the short-circuit welding period Ts is provided before the pulse welding period Tp. Thus, in switching to the pulse welding period Tp, a molten pool is formed immediately under the arc and the generation of spatters by the first peak current Ip1 can be suppressed.

At an arc start during the short-circuit welding period Ts, as illustrated in FIG. 9, a non-load voltage V1 that is higher than the welding voltage during the pulse welding period Tp is output and the welding wire 18 is fed at constant feed speed W1 until the welding wire 18 is short circuited with the base material 17 and a current is detected. The welding current I1 after the current is detected is larger than the welding current at short-circuit release in main welding. The welding current I1 is kept to be output during a predetermined period. During this period, the welding wire 18 is reversely fed with a preset amplitude. After short-circuit release, feeding of the welding wire 18 is performed by repeating forward feeding and reverse feeding with preset amplitude and frequency. FIG. 9 illustrates a case where a feeding waveform is a sine waveform but the feeding waveform may be any waveform, such as, for example, a trapezoidal waveform (not illustrated) or the like, as long as the waveform is a cyclical waveform. The frequency (cycle) may be constant, and also may fluctuate. When feeding is performed at constant feed speed without any preset amplitude and frequency, the feeding can be easily managed, but spatters tend to be generated by an electromagnetic pinch force at short-circuit release. Therefore, by mechanically performing forward feeding and reverse feeding of the welding wire 18 at preset amplitude and frequency, the generation of spatters at short-circuit release during the short-circuit welding period Ts can be suppressed.

The droplet transfer state at this time is illustrated in the lowest stage in FIG. 9. A state (a) indicates the droplet transfer state in an arc period of short-circuit arc welding during the short-circuit welding period Ts and, in the state (a), the welding wire 18 is fed forward while generating an arc. A state (b) indicates the droplet transfer state in a short-circuit period of short-circuit arc welding during the short-circuit welding period Ts and, in the state (b), the wire is reversely fed after a droplet at a welding wire tip end is transferred to the base material 17 and short-circuit release is mechanically urged. Next, feeding of the welding wire 18 during the pulse welding period Tp is performed with a welding current set by the pulse welding setting part 24 at optimal constant feed speed, and a droplet formed at the tip end of the welding wire 18 during the basic unit period Tpb that is the sum of the first peak period Tp1 and the base period Tb illustrated in FIG. 2 is detached and transferred toward the base material 17 during the first peak period Tp1 or immediately after the first peak period Tp1. During the cooling period Tn after the pulse welding period Tp ends, as illustrated in a state (d), the feed speed of the welding wire 18 is stopped. A distance from the welding wire tip end to the base material 17 at that time is WD. Furthermore, after the cooling period Tn has elapsed, a next cycle is executed again and, as illustrated in a state (e), the welding wire 18 contacts the base material 17 and a current is detected, and thereafter, a next short-circuit welding period Ts starts again. As described above, the arc maintained during the short-circuit welding period Ts and the pulse welding period Tp extinguishes during the cooling period Tn and an arc needs to be generated again at the time of switching to a next short-circuit welding period Ts. Therefore, spatters tend to be generated by an electromagnetic pinch force at the time of short-circuit release at an initial stage of an arc start. However, as described in this embodiment, during the short-circuit welding period Ts, the welding wire 18 is mechanically fed forwardly or reversely, and therefore, the generation of spatters during at short-circuit release at the initial stage of the arc start can be suppressed. That is, during the short-circuit welding period Ts, by feeding the welding wire 18 forwardly or reversely and mechanically releasing a short-circuit state, the generation of spatters by the electromagnetic pinch force can be reduced.

As illustrated in FIG. 9, the welding current I and the feed speed W during the short-circuit welding period Ts are changed momentarily. Specifically, the average feed speed of the feed speed is gradually increased such that the feed amount gets closer to a setting feeding amount of a welding condition during the pulse welding period Tp.

According to this embodiment, by performing pulse welding control described in the first embodiment during the pulse welding period Tp, similar effects to those of the first embodiment can be achieved.

Furthermore, by performing welding in a cycle in which the short-circuit welding period Ts, the pulse welding period Tp, and the cooling period Tn that have been described above are repeated successively, each of short-circuit welding with low heat input, pulse welding with high heat input, and the cooling period in which the amount of heat input is zero is adjusted. Thus, the amount of heat input to the base material 17 can be controlled in a wide range and the weld bead shape can be more precisely controlled. Moreover, pulse welding during the pulse welding period Tp can be stably performed with a low welding current (for example, the setting current Is is 40 A or more and 190 A or less), and therefore, the present disclosure can be applied to welding of the base material 17 having an even thinner thickness (for example, a thickness of 1 mm or more and 6 mm or less).

Note that, during the short-circuit welding period Ts, the welding wire 18 is fed at preset amplitude and frequency, but the present disclosure is not limited thereto. As described above, in order to facilitate management, the welding wire 18 may be fed at constant feed speed during the short-circuit welding period Ts.

During the pulse welding period Tp, the welding wire 18 is fed at constant feed speed, but the present disclosure is not limited thereto. The feed speed of the welding wire 18 may be caused to fluctuate during the pulse welding period Tp.

During the short-circuit welding period Ts, the average feed speed Ws is increased to constant feed speed during the pulse welding period Tp, but the present disclosure is not limited thereto. The average feed speed Ws at an end of the short-circuit welding period Ts may be different from the constant feed speed during the pulse welding period Tp.

Note that, although not illustrated, a second short-circuit welding period Tse may be provided between the pulse welding period Tp and the cooling period Tn illustrated in FIG. 9. During the second short-circuit welding period Tse, the average feed speed Ws is gradually reduced. By short-circuit welding, the arc length can be made short, as compared to pulse welding, the distance WD from the welding wire tip end to the base material at an end of welding can be made short, fluctuation of the cooling period Tn can be made small, and the cycle Pc of the pulse welding period can be made constant, so that a uniform weld bead can be formed.

Other Embodiments

Note that, in the first and second embodiments, the tip end of the welding wire 18 may be caused to be tilted at a predetermined angle with respect to the welding direction during pulse welding. In that case, as illustrated in FIG. 10, the welding wire 18 is preferably advanced in a state where the welding wire 18 faces in a direction perpendicular to the welding direction, that is, in a so-called vertical direction, or in a state where the welding wire 18 is tilted such that the tip end of the welding wire 18 is located in front of a vertical position in the welding direction.

On the other hand, when the welding wire 18 is retreated in a state where the welding wire 18 is tilted such that the tip end of the welding wire 18 is located behind the vertical position in the welding direction, the weld bead tends to be exposed to metal vapor after being formed, particularly in a case where the base material 17 or the welding wire 18 is aluminum or an alloy containing aluminum as a main component, and smut tends to adhere thereto. Therefore, it is not preferable to retreat the welding wire 18 in the above-described state.

Note that, in order to reliably prevent adhesion of smut, it is preferable to advance the welding wire 18 and an advance angle θ (see FIG. 10) in that case is preferably 20 degrees or less and more preferably 10 degrees. In a case where the base material 17 or the welding wire 18 is a hard aluminum-based material, it is more preferable to advance the welding wire 18.

Note that the shield gas may include $CO_2$ gas or $O_2$ gas. For example, the shield gas may be a mixed gas of 80% of Ar gas and 20% of $CO_2$ gas and may be a mixed gas of 98% Ar gas and 2% $O_2$ gas. However, $CO_2$ gas is decomposed to generate oxygen ($O_2$) during arc welding. This oxygen and a metal forming the welding wire 18 or the base material 17 react with each other and smut is formed. Therefore, a ratio of $CO_2$ gas or $O_2$ gas is preferably low in a range suitable to a specification of arc welding. From this point of view, the shield gas is more preferably 100% of Ar gas.

As the shield gas, 100% He (helium) gas may be used. Also in this case, neither oxygen nor $CO_2$ is contained in the shield gas, and therefore, smut is less likely to adhere to the base material 17.

Note that, in the first and second embodiments, the base material 17 is formed of aluminum or an alloy containing aluminum as a main component and the welding wire 18 is formed of hard aluminum, but the materials of the base material 17 and the welding wire 18 are not particularly limited thereto and may be other materials. For example, the base material 17 may be formed of soft steel and the welding wire 18 may be formed of an iron material.

Moreover, regardless of the material of the base material 17, in a case where the base material 17 is a so-called thin plate having a thickness of 1 mm or more and 6 mm or less, it is necessary to set the setting current Is low and perform pulse welding with a low welding current, and therefore, the arc welding control methods described in the first and second embodiments are particularly useful.

According to an arc welding control method of the present disclosure, stable welding can be performed with a low welding, a weld bead having a good appearance can be stably formed, and therefore, the arc welding control method of the present disclosure is particularly useful in application to pulse welding of a thin plate.

What is claimed is:

1. An arc welding control method including a pulse welding period in which an arc is generated between a base material and a welding wire by feeding the welding wire toward the base material at a predetermined feed speed and causing a peak current and a base current to alternately flow through the welding wire, wherein:

the pulse welding period alternately includes:
(i) a first peak period in which a first peak current whose peak current value is a first current value is caused to flow through the welding wire; and
(ii) a base period in which a base current having a second current value is caused to flow through the welding wire;

during the base period, a second peak current is superimposed on the base current at a second pulse frequency that is higher than a first pulse frequency of the first peak current such that a peak current value of the second peak current is a sum of the second current value and a third current value;

the sum of the second current value and the third current value is smaller than the first current value;

a second peak period in which the second peak current is caused to flow through the welding wire once is shorter than the first peak period;

a droplet is transferred from the welding wire toward the base material during the first peak period or immediately after the first peak period;

the peak current value of the first peak current is a maximum value of a pulsed current waveform;

a first short-circuit welding period is provided after the pulse welding period; and in the first short-circuit welding period, a state in which the arc is generated between the base material and the welding wire and a state in which the base material and the welding wire are short circuited are alternately repeated by alternately repeating forward feeding and reverse feeding of the welding wire with respect to the base material.

2. The arc welding control method of claim 1, wherein a cooling period in which an amount of heat input to the base material is made zero is provided between the pulse welding period and the first short-circuit welding period.

3. The arc welding control method of claim 2, wherein:
a second short-circuit welding period is further provided between the pulse welding period and the cooling period; and
in the second short-circuit welding period, a state in which the arc is generated between the base material and the welding wire and a state in which the base material and the welding wire are short circuited are alternately repeated by alternately repeating forward feeding and reverse feeding of the welding wire with respect to the base material.

4. The arc welding control method of claim 1, wherein each of the base material and the welding wire is aluminum or an alloy containing aluminum as a main component.

5. The arc welding control method of claim 1, wherein the base material has a thickness of 1 mm or more and 6 mm or less.

6. The arc welding control method of claim 1, wherein a shield gas that is sprayed to the base material contains argon gas at a ratio of 80% or more.

7. The arc welding control method of claim 1, wherein a shield gas that is sprayed to the base material is helium gas.

8. The arc welding control method of claim 1, wherein during the base period, the second peak current is superimposed on the base current multiple times.

9. The arc welding control method of claim 1, wherein the second pulse frequency is 300 Hz or more and 3000 Hz or less.

10. The arc welding control method of claim 1, wherein the second pulse frequency is 300 Hz or more and 1000 Hz or less.

11. The arc welding control method of claim 1, wherein:
when the base period is a first base period and a second base period in which the base current is caused to flow through the welding wire is provided following the second peak period or immediately before the second peak period, the second base period is the same as or longer than the second peak period, and the second pulse frequency is an inverse of a sum of the second peak period and the second base period.

12. The arc welding control method of claim 1, wherein a second peak voltage that is a welding voltage during the second peak period is lower than a first peak voltage that is a welding voltage during the first peak period.

13. The arc welding control method of claim 1, wherein:
the first peak current is higher than the second peak current; and
each of the first peak current and the second peak current is higher than the base current.

14. The arc welding control method of claim 1, wherein the base material is irradiated with the arc during the base period such that an arc force fluctuates at the second pulse frequency to suppress adhesion of a metal oxide, which is a combination of metal vapor and oxygen, of the welding wire or the base material to a surface of the base material.

* * * * *